(12) United States Patent
Kim et al.

(10) Patent No.: US 12,055,891 B2
(45) Date of Patent: Aug. 6, 2024

(54) OPERATION METHOD FOR DIGITAL HOLOGRAM IMPLEMENTATION DEVICE

(71) Applicant: ELECTRONICS AND TELECOMMUNICATIONS RESEARCH INSTITUTE, Daejeon (KR)

(72) Inventors: Yong Hae Kim, Daejeon (KR); Gi Heon Kim, Daejeon (KR); Joo Yeon Kim, Daejeon (KR); Jong-Heon Yang, Daejeon (KR); Sang Hoon Cheon, Daejeon (KR); Seong-Mok Cho, Daejeon (KR); Kyunghee Choi, Daejeon (KR); Ji Hun Choi, Daejeon (KR); Jae-Eun Pi, Sejong (KR); Chi-Sun Hwang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 449 days.

(21) Appl. No.: 17/491,246

(22) Filed: Sep. 30, 2021

(65) Prior Publication Data
US 2022/0137556 A1    May 5, 2022

(30) Foreign Application Priority Data
Nov. 2, 2020    (KR) .................. 10-2020-0144422

(51) Int. Cl.
*G03H 1/22*    (2006.01)
(52) U.S. Cl.
CPC ....... *G03H 1/2294* (2013.01); *G03H 2225/22* (2013.01); *G03H 2225/34* (2013.01)

(58) Field of Classification Search
CPC ............ G03H 1/2294; G03H 2225/22; G03H 2225/34; G03H 2001/0816; G03H 1/0808; G03H 1/0443; G03H 2001/0224
(Continued)

(56) References Cited

U.S. PATENT DOCUMENTS

| 6,262,818 B1 | 7/2001 | Cuche et al. |
| 8,462,408 B2 | 6/2013 | Kroll et al. |

(Continued)

FOREIGN PATENT DOCUMENTS

| JP | 2002-526815 A | 8/2002 |
| JP | 2010-517107 A | 5/2010 |

(Continued)

OTHER PUBLICATIONS

M. Persson et al., "Reducing the effect of pixel crosstalk in phase only spatial light modulators", Optics express, 2012.

*Primary Examiner* — Audrey Y Chang (57) ABSTRACT

Provided is an operation method for a digital hologram implementation device including a backlight and a spatial light modulator, the operation method including setting an initial phase value of an optical signal to a remedy phase, computing a reduced phase based on the remedy phase, correcting the remedy phase based on a difference between the reduced phase and a preset optimized phase, determining whether the corrected remedy phase is a stabilized phase, performing forward propagation on the stabilized phase and an amplitude of the optical signal, correcting the amplitude of the optical signal, performing backward propagation on the corrected amplitude and the stabilized phase, and determining whether a phase derived by the backward propagation is an optimized phase.

12 Claims, 9 Drawing Sheets

(58) Field of Classification Search
USPC .............................................................. 359/9
See application file for complete search history.

(56) References Cited

U.S. PATENT DOCUMENTS

| | | |
|---|---|---|
| 8,462,409 B2 | 6/2013 | Olaya |
| 10,241,327 B2 | 3/2019 | Guillon et al. |
| 2002/0001109 A1* | 1/2002 | Hamano ............ G02F 1/133371 |
| | | 359/9 |
| 2006/0139711 A1* | 6/2006 | Leister ................. G03H 1/2294 |
| | | 359/9 |
| 2009/0213443 A1 | 8/2009 | Kang et al. |
| 2013/0135702 A1* | 5/2013 | Martinez .............. G03H 1/0011 |
| | | 359/9 |
| 2014/0211286 A1 | 7/2014 | Nam et al. |
| 2019/0121291 A1 | 4/2019 | Leister et al. |

FOREIGN PATENT DOCUMENTS

| | | |
|---|---|---|
| KR | 10-2010-0017870 A | 2/2010 |
| KR | 10-2019-0008568 A | 1/2019 |
| WO | 2017051158 A1 | 3/2017 |

* cited by examiner

Ideal_1    Ideal_2

OPERATION METHOD FOR DIGITAL HOLOGRAM IMPLEMENTATION DEVICE

CROSS-REFERENCE TO RELATED APPLICATIONS

This U.S. non-provisional patent application claims priority under 35 U.S.C. § 119 of Korean Patent Application No. 10-2020-0144422, filed on Nov. 2, 2020, the entire contents of which are hereby incorporated by reference.

BACKGROUND

The present disclosure herein relates to a holography technology, and more particularly to an operation method for a digital hologram implementation device in which a distortion phenomenon is alleviated.

Unlike in the typical scheme that allows a user to feel a three-dimensional effect through an optical illusion, a user directly views the forming of an actual image with eyes in a holographic image, and thus, the user feels the three-dimensional effect as in the viewing of a real object. A holographic technology fundamentally prevents eye fatigue that is caused by a scheme of allowing a 3D image to be viewed with binocular disparity, and thus is drawing much attention as a next generation 3D image technology that is ultimately to be achieved.

The holographic technology uses the principle for recording and reproducing the amplitude and phase of an interference signal obtained from a reference wave that is coherent with an object wave reflected by an object. In order to implement image processing using the holographic technology, a computer-generated hologram (CGH) has been developed, and with the recent development of a digital industry, devices for displaying computer-generated holograms of a moving image type as well as a static image type are being developed.

The computer-generated hologram is to make an interference pattern to be directly stored in a hologram using a computer. An interference pattern image is calculated and made by means of the computer, and then is transmitted to a spatial light modulator such as an LC-SLM (Liquid Crystal-Spatial Light Modulator). Such a spatial light modulator is irradiated with reference light to reproduce a restored 3D image. The LC-SLM may use liquid crystals to modulate the amplitude or phase of a wave surface.

SUMMARY

The present disclosure provides an operation method for a digital hologram implementation device in which a distortion phenomenon is alleviated.

An embodiment of the inventive concept provides an operation method for a digital hologram implementation device including a backlight and a spatial light modulator, the operation method including: setting an initial phase value of an optical signal to a remedy phase; computing a reduced phase on a basis of the remedy phase; correcting the remedy phase on a basis of a difference between the reduced phase and a preset optimized phase; determining whether the corrected remedy phase is a stabilized phase; performing forward propagation on the stabilized phase and an amplitude of the optical signal; correcting the amplitude of the optical signal; performing backward propagation on the corrected amplitude and the stabilized phase; and determining whether a phase derived by the backward propagation is an optimized phase.

In an embodiment, the spatial light modulator may be a liquid crystal-spatial light modulator.

In an embodiment, the spatial light modulator may include a two-dimensional pixel array structure including a plurality of pixels configured to record and reproduce a digital hologram as an electrical signal.

In an embodiment, the forward propagation and the backward propagation may use at least one of Fourier, Fresnel, Angular Spectrum, or Rayleigh-Sommerfeld computation schemes.

In an embodiment, when the corrected remedy phase is greater than about $3\pi$, the corrected remedy phase may be fixed to about $3\pi$.

In an embodiment, when the corrected remedy phase is not determined as the stabilized phase, the operation method may further include performing sequentially: the computing of the reduced phase based on the remedy phase; the correcting of the remedy phase based on the difference between the reduced phase and the preset optimized phase; and the determining of whether the corrected remedy phase is the stabilized phase.

In an embodiment, the performing sequentially may be repeated as many as times corresponding to a natural number of 1 to 100.

In an embodiment, the operation method may further include implementing a hologram image on a basis of the optimized phase, when the phase derived by the backward propagation is determined to be the optimized phase.

In an embodiment, when the phase derived by the backward propagation is not determined to be the optimized phase, the operation method may further include performing sequentially: the computing of the reduced phase based on the remedy phase; the correcting of the remedy phase based on the difference between the reduced phase and a preset optimized phase; the determining of whether the corrected remedy phase is the stabilized phase; the performing of the forward propagation on the stabilized phase and the amplitude of the optical signal; the correcting of the amplitude of the optical signal; the performing of the backward propagation on the corrected amplitude and the stabilized phase; and the determining of whether the phase derived by the backward propagation is the optimized phase.

In an embodiment, the performing sequentially may be repeated as many as times corresponding to a natural number of 1 to 100.

In an embodiment, the operation method may further include setting the phase derived by the backward propagation to the remedy phase, when the phase derived by the backward propagation is not determined to be the optimized phase.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, an embodiment of the present disclosure will be described in detail with reference to the accompanying drawings such that a person skilled in the art may easily carry out the embodiments of the present disclosure.

The terms and words used in the following description and claims are to describe embodiments but are not intended to limit the inventive concept. As used herein, the singular forms "a," "an" and "the" are intended to include the plural forms as well, unless the context clearly indicates otherwise. It will be further understood that the terms "comprises," "comprising," "includes" and/or "including," when used in this specification, do not preclude the presence or addition of one or more other components, steps, operations, and/or elements.

Terms such as first and/or second may be used to describe various components, but the components should not be limited by the terms. The terms are used only for the purpose of distinguishing one component from another. For instance, a first component may be referred to as a second component, or similarly, a second component may be referred to as a first component, without departing from the scope of the present disclosure.

Unless otherwise defined, all terms (including technical and scientific terms) used herein have the same meaning as commonly understood by one of ordinary skill in the art to which the invention belongs. It will be further understood that terms, such as those defined in commonly-used dictionaries will not be interpreted in an idealized or overly formal sense unless expressly so defined herein. Like reference numerals denote like elements throughout the entire specification.

Figure 1:
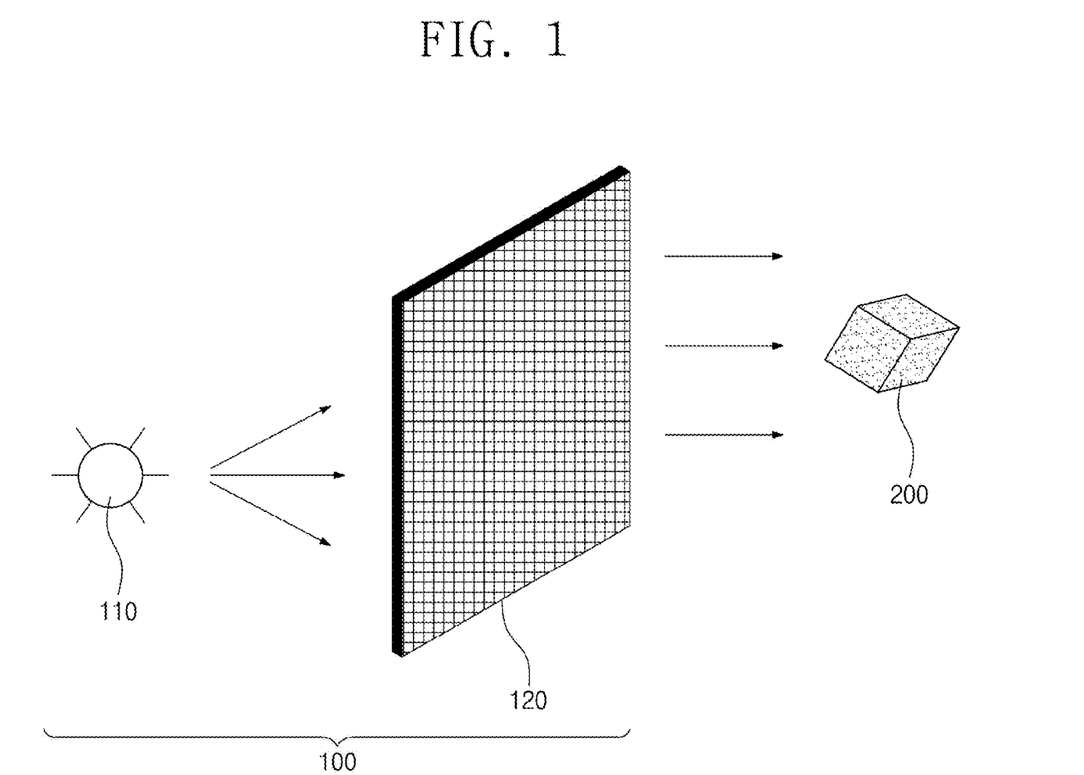
FIG. 1 is a schematic diagram of a digital hologram implementation device according to an embodiment of the inventive concept.

FIG. 1 is a schematic diagram of a digital hologram implementation device 100 according to an embodiment of the inventive concept. Referring to FIG. 1, the digital hologram implementation device 100 implements a digital hologram, and may include a backlight 110 and a spatial light modulator (SLM) 120.

The backlight 110 may include a laser light source, or a light emitting diode (LED) light source that generates parallel light having coherent characteristics. The laser light source may include a red, green, or blue laser, and the LED light source may include a red, green, or blue LED. The backlight 110 may irradiate the SLM 120 with the generated coherent parallel light.

The SLM 120 may have a two-dimensional pixel array structure including a plurality of pixels configured to record and reproduce the digital hologram as an electrical signal. Each of the plurality of pixels included in the SLM 120 may have a rectangular, polygonal, or irregular shape. The SLM 120 may modulate the amplitude or phase of the coherent parallel light irradiated from the backlight 110.

The SLM 120 may cause the light input from the backlight 110 to interfere with a light wave showing input image information. In an embodiment of the inventive concept, the SLM 120 may be a Liquid Crystal-Spatial Light Modulator (LS-SLM). The LS-SLM may modulate the amplitude and phase of the input light wave based on a voltage applied to the liquid crystals, and output the modulated result to implement a hologram image 200.

The hologram image 200 implemented by the digital hologram implementation device 100 may be normally observed within a viewing angle. The viewing angle due to the digital hologram implementation device 100 may be expressed as Equation (1), where λ denotes the wavelength of the coherent parallel light emitted from the backlight 110, and p means a pixel pitch of the SLM 120.

$$\text{Viewing Angle}=\sin^{-1}(\lambda/p) \quad (1)$$

In order to determine the viewing angle according to Equation (1), the SLM 120 is required to operate ideally. In addition, as the pixel pitch of the SLM 120 is reduced, the range of the viewing angle becomes wider, but there exists a physical limit in reducing the pixel pitch in implementing the SLM 120. For example, for the LC-SLM, the interval between cells of the liquid crystals is about 2.5 μm, and thus a crosstalk phenomenon may occur in a hologram image implemented by the LC-SLM of which the pixel pitch is about 2.5 μm.

The inventive concept presents the digital hologram implementation device 100 that may alleviate a distortion of the hologram image 200, the distortion being caused by the crosstalk phenomenon, and an operation method therefor. According to the digital implementation device 100 and an operation method therefor of the inventive concept, hologram reconstruction characteristics may be prevented from being defective due to the crosstalk phenomenon, and both the brightness uniformity and the viewing angle of the hologram image may be enhanced.

Figure 2A:
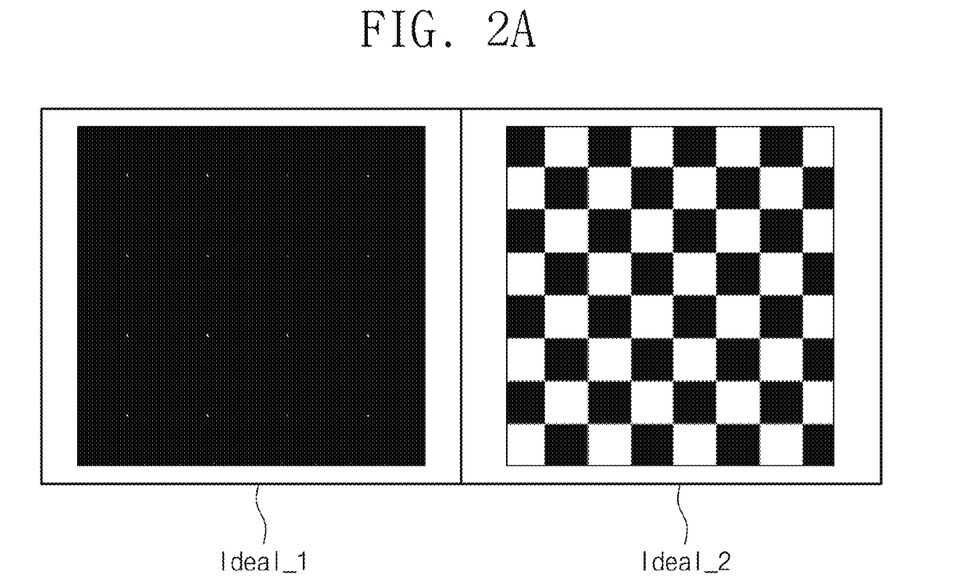
FIGS. 2A and 2B are diagrams for describing an influence of a crosstalk phenomenon on a hologram image.
Figure 2B:
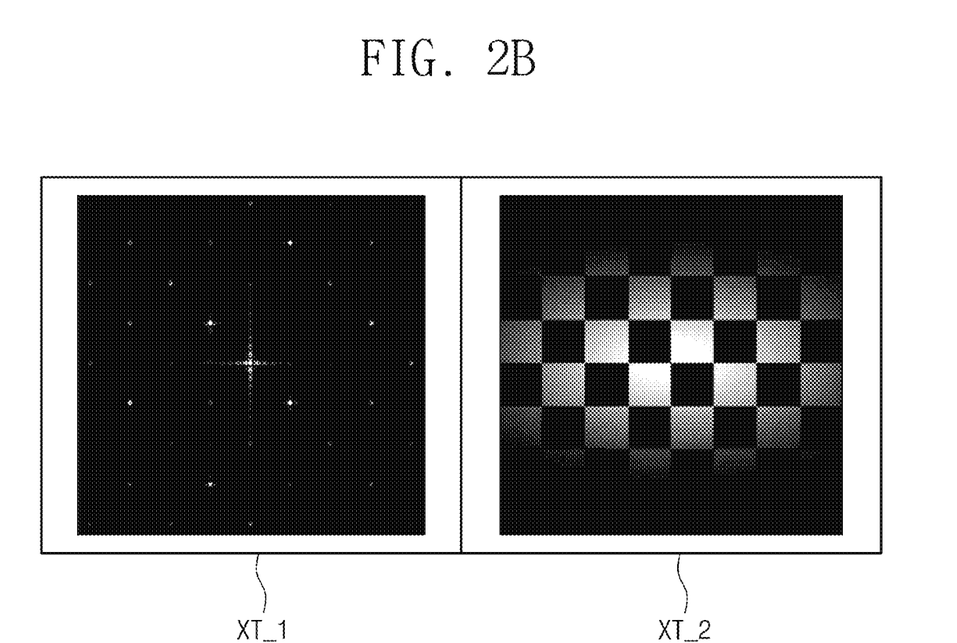

FIGS. 2A and 2B are diagrams for describing an influence of the crosstalk phenomenon on the hologram image. More specifically, FIG. 2A discloses a first image Ideal_1 and a second image Ideal_2 implemented by an ideal LC-SLM, and FIG. 2B discloses a first image XT_1 and a second image XT_2 in which crosstalk characteristics are shown.

When the first image Ideal_1 implemented by the ideal LC-SLM as shown in FIG. 2A is compared with the first image XT_1 of FIG. 2B in which the crosstalk characteristics are shown, it may be understood that the brightness uniformity of a plurality of points becomes defective due to the crosstalk characteristics. In addition, when the second image Ideal_2 implemented by the ideal LC-SLM as shown in FIG. 2A is compared with the second image XT_2 of FIG. 2B in which the crosstalk characteristics are shown, it may be understood that the hologram image is sharply implemented only at a smaller angle than the ideal viewing angle and is dark around the ideal viewing angle.

The digital hologram implementation device 100 (see FIG. 1) and the operation method therefor according to an embodiment of the inventive concept use a Gerchberg-Saxton (GS) algorithm for calculating a phase hologram for improving brightness uniformity defects due to a crosstalk phenomenon, but an algorithm for phase increments is further employed to be able to alleviate an image distortion phenomenon due to the crosstalk phenomenon. Details about the algorithm to be used in the digital hologram implementation device 100 will be described with reference to FIGS. 4 to 8.

Figure 3:
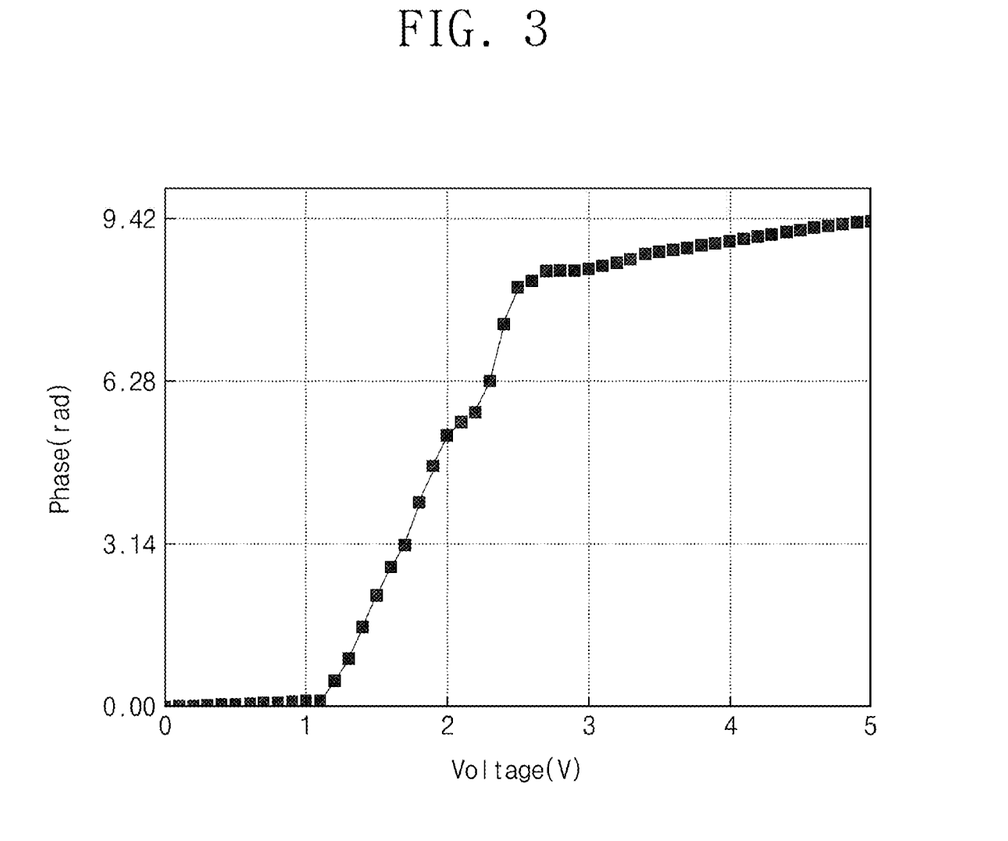
FIG. 3 is a graph for describing a relationship between a voltage applied to a liquid crystal-spatial light modulator and a phase.

FIG. 3 is a graph for describing a relationship between a voltage applied to an LC-SLM and a phase. The LC-SLM may modulate the amplitude or phase of the input light wave based on the applied voltage. An LC-SLM of which a cell interval is about 2.5 μm is used for deriving the result of FIG. 3. Referring to FIG. 3, it may be understood that, as the voltage applied to the LC-SLM increases, the phase also increases. The LC-SLM of which a cell interval is about 2.5 μm may generate a phase change of about $3\pi$, while the voltage changes by about 5V.

Figure 4:
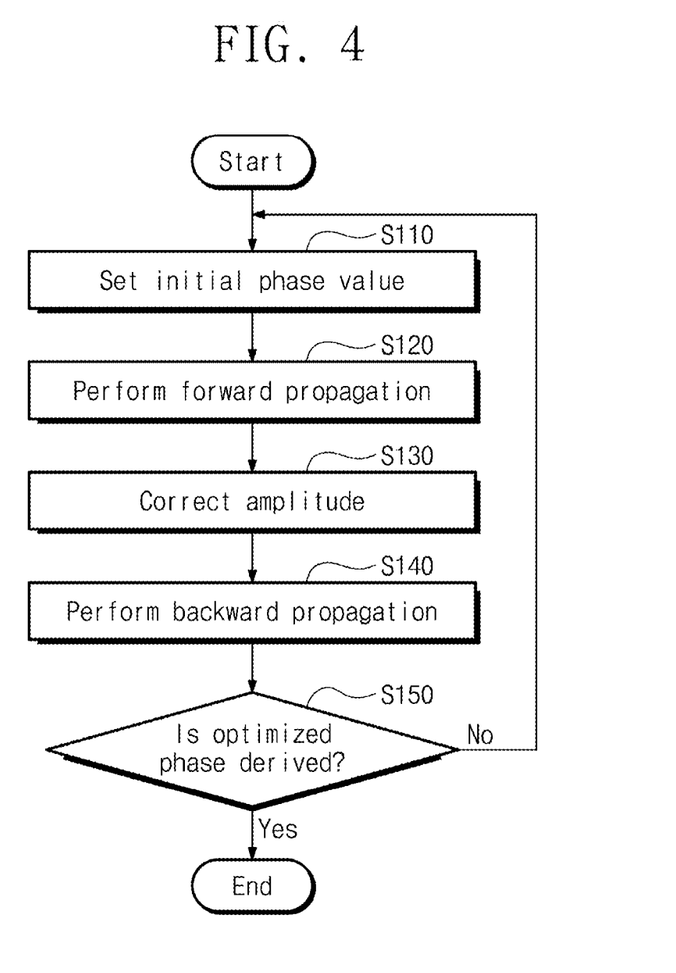
FIG. 4 is a flowchart showing a computation method for implementing a hologram image based on a Gerchberg-Saxton algorithm.

FIG. 4 is a flowchart showing a computation method for implementing a hologram image based on the Gerchberg-Saxton algorithm. The Gerchberg-Saxton algorithm is a repetitive algorithm that searches for phases of a valid distribution through a propagation function such as a Fourier transform. The Gerchberg-Saxton algorithm may also be effectively applied to a two-dimensional signal as well as a one-dimensional signal.

In step S110, the SLM 120 (see FIG. 1) may set an initial phase value of an optical signal. In addition, an initial amplitude value of the optical signal may be input. The input initial phase and amplitude values may be based on the time domain.

In step S120, the SLM 120 may perform forward propagation on the initial phase and amplitude values. The forward propagation may use various hologram computation schemes. For example, the forward propagation may use a Fourier, Fresnel, angular spectrum, or Rayleigh-Sommerfeld computation. The initial phase and amplitude values may be modified into values in the frequency domain by the forward propagation.

In step S130, the SLM 120 may correct the amplitude value in the frequency domain, which is acquired through the forward propagation. More specifically, the SLM 120 may reduce a computation window with respect to the acquired amplitude value in the frequency domain. In addition, the amplitude value may be amended by weighting an input desired amplitude value.

In step S140, the SLM 120 may perform backward propagation on the initial phase and the amended amplitude value. The backward propagation may use various hologram computation schemes. For example, the backward propagation may use a Fourier, Fresnel, angular spectrum, or Rayleigh-Sommerfeld computation. The initial phase and the amended amplitude value may be modified into values in the time domain by the backward propagation.

In step S150, the SLM 120 may determine whether the phase derived by the backward propagation is optimized. The optimized phase means a phase at which the sharpness of the hologram image implemented by the SLM 120 may be optimized. When the derived phase is determined to be the optimized phase, the procedure may end. When the derived phase is not determined to be the optimized phase, the procedure may return to step S110 and repeat the above-described steps.

Figure 5:
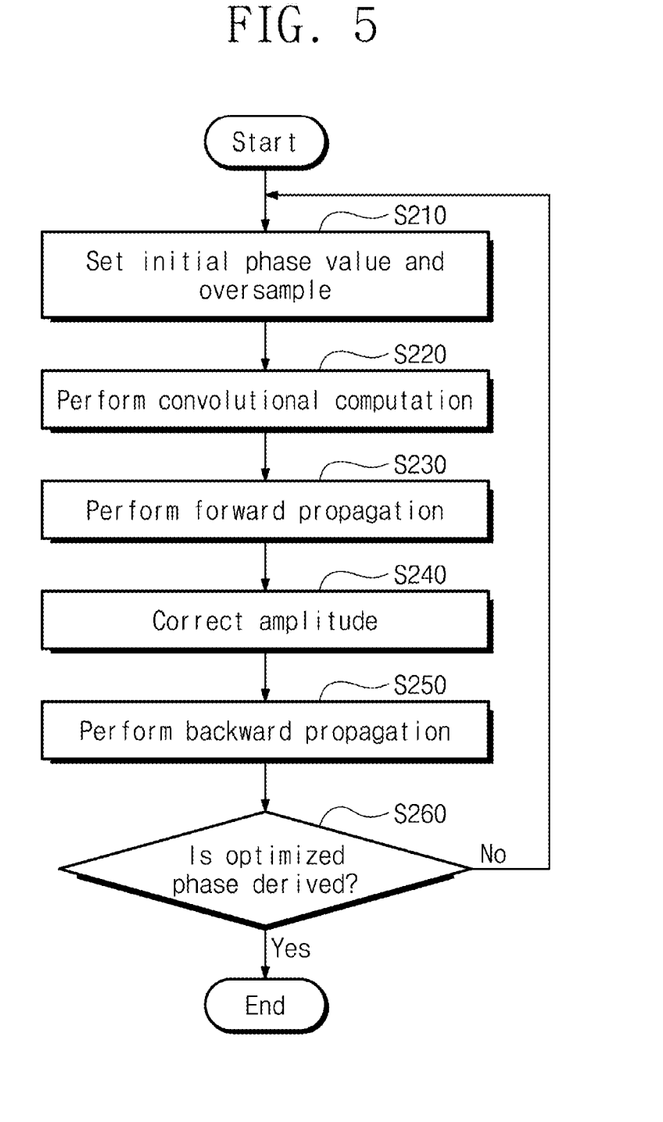
FIG. 5 is a flowchart showing a computation method for implementing a hologram image based on a first algorithm including a crosstalk effect in the Gerchberg-Saxton algorithm.

FIG. 5 is a flowchart showing a computation method for implementing a hologram image based on a first algorithm including a crosstalk effect in the Gerchberg-Saxton algorithm. The digital hologram implementation device 100 (see FIG. 1) according to an embodiment of the inventive concept is to alleviate the crosstalk effect, and may implement an algorithm including the first algorithm for generating the crosstalk effect into the algorithm described with reference to FIG. 4.

In step S210, the SLM 120 (see FIG. 1) may set an initial phase value of an optical signal and oversample a phase value on the basis thereof. The input initial phase value and the oversampled phase value may be based on the time domain.

In step S220, the SLM 120 may perform a convolutional computation on the oversampled phase value. The convolutional computation may be based on a convolutional kernel value input to the SLM 120.

In step S230, the SLM 120 may perform forward propagation on the phase value on which the convolutional computation is performed and an initial amplitude value. The initial amplitude value may be input to the SLM 120 after the convolutional computation for the initial phase value. The forward propagation may use various hologram computation schemes. For example, the forward propagation may use a Fourier, Fresnel, angular spectrum, or Rayleigh-Sommerfeld computation. The initial phase and amplitude values may be modified into values in the frequency domain by the forward propagation.

In step S240, the SLM 120 may correct the amplitude value in the frequency domain, which is acquired through the forward propagation. More specifically, the SLM 120 may reduce a computation window with respect to the acquired amplitude value in the frequency domain. The amplitude value may be amended by weighting a desired amplitude value based on the amplitude value of the reduced computation window in the frequency domain. The desired amplitude value means a desired amplitude for the hologram image desired to implement by means of the digital hologram implementation device 100. The desired amplitude value may reflect a positive or negative gain to be weighted.

In step S250, the SLM 120 may perform backward propagation on the initial phase value and the amended amplitude value. The backward propagation may use various hologram computation schemes. For example, the backward propagation may use a Fourier, Fresnel, angular spectrum, or Rayleigh-Sommerfeld computation. The initial phase value and the amended amplitude value may be modified into values in the time domain by the backward propagation.

In step S260, the SLM 120 may determine whether the phase derived by the backward propagation is optimized. When the derived phase is determined to be the optimized phase, the procedure may end. When the derived phase is not determined to be the optimized phase, the procedure may return to step S210 and repeat the above-described steps.

According to the first algorithm disclosed in FIG. 5, the optimized phase may be derived up to about $2\pi$. According to the first algorithm, the brightness uniformity defects may be improved in comparison to the hologram image implementation by the Gerchberg-Saxton algorithm disclosed in FIG. 4. However, the brightness reduction issue around the viewing angle is not addressed. Hologram image simulation results based on the Gerchberg-Saxton algorithm and the first algorithm will be disclosed with reference to FIG. 9 to be described later.

Figure 6:
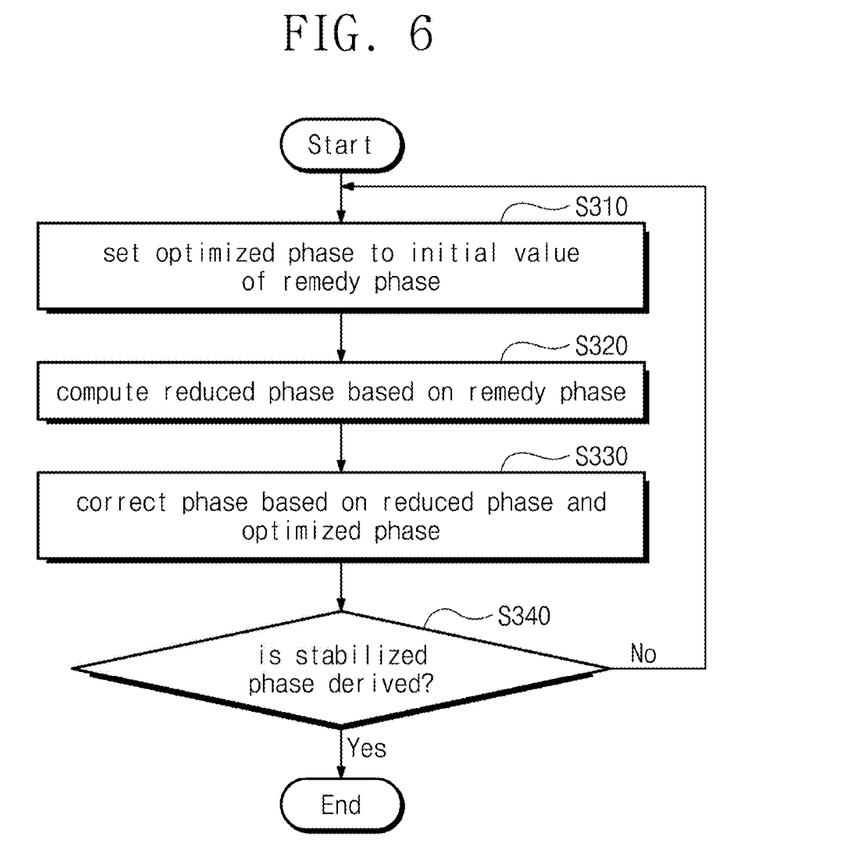
FIG. 6 is a flowchart showing a computation method for implementing a hologram image based on a second algorithm for performing phase increments.

FIG. 6 is a flowchart showing a computation method for implementing a hologram image based on a second algorithm for performing phase increments. The digital hologram implementation device 100 (see FIG. 1) according to an embodiment of the inventive concept is required to perform phase increments for addressing the brightness reduction issue around the viewing angle, which occurs due to a crosstalk.

The SLM 120 may use an LC-SLM for maximizing a phase change. The LC-SLM may have the characteristics that the phase change is equal to or greater than about $2\pi$. The digital hologram implementation device 100 according to an embodiment of the inventive concept may adopt the second algorithm for performing the phase increments for achieving a phase change of about $3\pi$ displayable by the LC-SLM.

In step S310, the LC-SLM may set the optimized phase as an initial value of a remedy phase. For example, the optimized phase means a phase value finally derived based on the first algorithm disclosed in FIG. 5.

In step 320, the LC-SLM may compute a reduced phase when the crosstalk phenomenon is applied to the remedy phase.

In step S330, the LC-SLM may perform phase correction. The LC-SLM may correct the phase based on the difference between the reduced phase derived in step S320 and the optimized phase used in step S310. For example, the corrected phase may be derived by adding the difference value between the reduced phase and the optimized phase to the remedy phase value derived in step S310. The corrected phase value in the LC-SLM may be maximum $3\pi$, and a value greater than about $3\pi$ may be fixed to about $3\pi$.

In step 340, the LC-SLM may determine whether the corrected phase value is a stabilized phase value. The stabilized phase means a phase at which the phase change in the LC-SLM is maximized to maximally improve the brightness around the viewing angle, and also be able to minimize the degree of the brightness uniformity defects to implement a hologram image. When the corrected phase is determined to be the stabilized phase, the procedure may end. When the derived phase is not determined to be the stabilized phase, the procedure may return to step S310 and repeat the above-described steps.

The digital hologram implementation device 100 according to an embodiment of the inventive concept merges the first algorithm disclosed in FIG. 5 with the second algorithm disclosed in FIG. 6 to address the issue due to the crosstalk phenomenon. The first algorithm and the second algorithm may be sequentially merged, or the second algorithm may be included in the first algorithm. A merging type and a computation scheme of the first algorithm and the second algorithm will be described in detail with reference to FIGS. 7 and 8.

Figure 7:
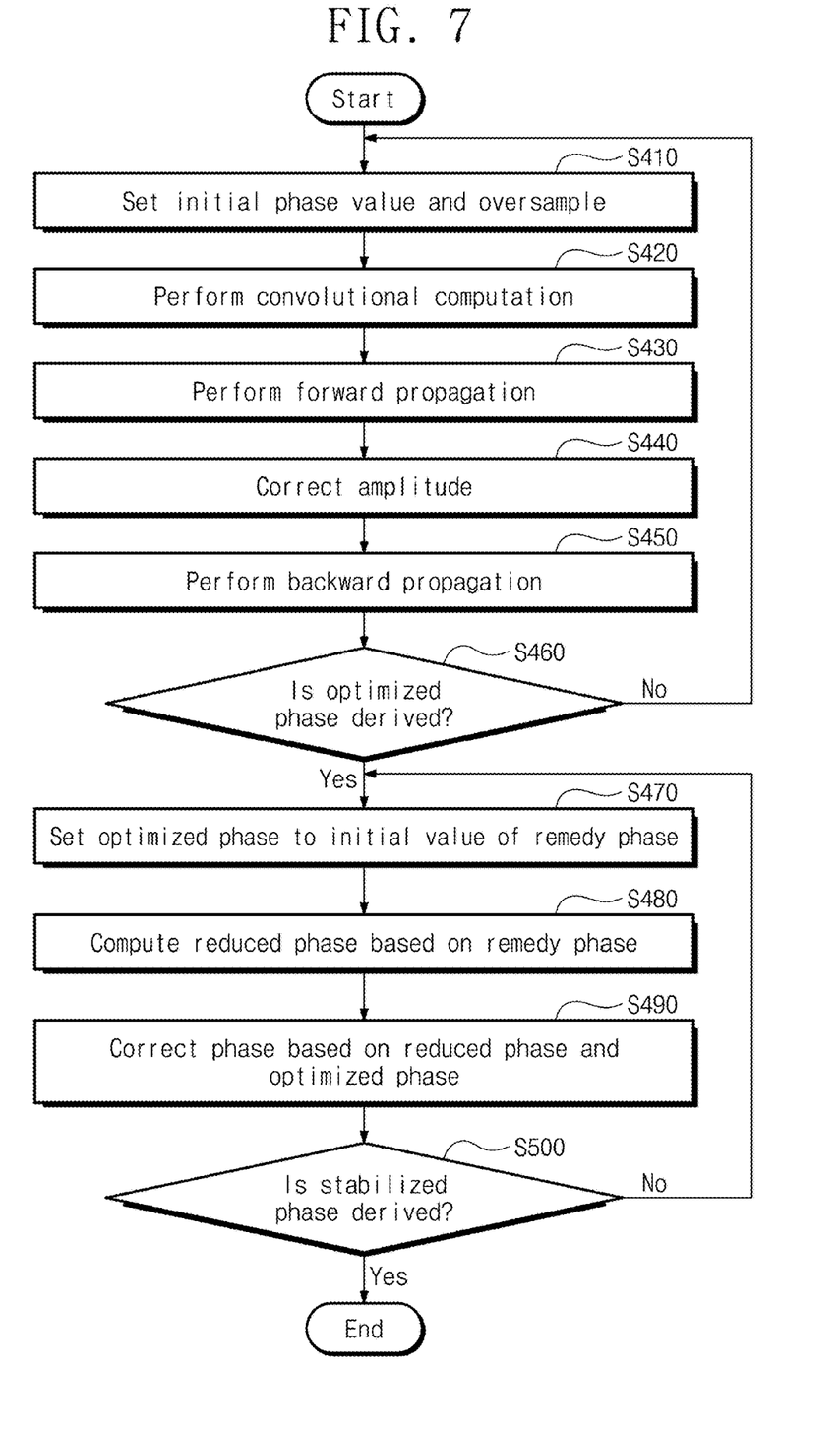
FIG. 7 is a flowchart showing a computation method for implementing a hologram image based on a third algorithm to which the first algorithm and the second algorithm are sequentially applied.

FIG. 7 is a flowchart showing a computation method for implementing a hologram image based on a third algorithm to which the first algorithm and the second algorithm are sequentially applied.

In step S410, the LC-SLM may set an initial phase value of an optical signal and oversample a phase value on the basis thereof. The input initial phase and the oversampled phase value may be based on the time domain.

In step S420, the LC-SLM may perform a convolutional computation on the oversampled phase value. The convolutional computation may be based on a convolutional kernel value input to the LC-SLM.

In step S430, the LC-SLM may perform forward propagation on the phase value on which the convolutional computation is performed and the initial amplitude value. The initial amplitude value may be input to the LC-SLM after the convolutional computation for the initial phase value. The forward propagation may use various hologram computation schemes. For example, the forward propagation may use a Fourier, Fresnel, angular spectrum, or Rayleigh-Sommerfeld computation. The initial phase and amplitude values may be modified into values in the frequency domain by the forward propagation.

In step S440, the LC-SLM may correct the amplitude value in the frequency domain, which is acquired through the forward propagation. More specifically, the LC-SLM may reduce a computation window with respect to the acquired amplitude value in the frequency domain. In addition, the amplitude value may be amended by weighting an input desired amplitude value. More specifically, the LC-SLM may reduce the computation window with respect to the acquired amplitude value in the frequency domain. The amplitude value may be amended by weighting the desired amplitude value based on the amplitude value of the reduced computation window in the frequency domain. The desired amplitude value means a desired amplitude for the hologram image desired to implement by means of the digital hologram implementation device 100. The desired amplitude value may reflect a positive or negative gain to be weighted.

In step S450, the LC-SLM may perform backward propagation on the initial phase value and the amended amplitude value. The backward propagation may use various hologram computation schemes. For example, the backward propagation may use a Fourier, Fresnel, angular spectrum, or Rayleigh-Sommerfeld computation. The initial phase value and the amended amplitude values may be modified into values in the time domain by the backward propagation.

In step S460, the LC-SLM may determine whether the phase derived by the backward propagation is optimized. When the derived phase is determined to be the optimized phase, the procedure may proceed to step S470. When the derived phase is not determined to be the optimized phase, the procedure may return to step S410 and repeat the above-described steps.

In step S470, the LC-SLM may set the optimized phase as an initial value of a remedy phase. The optimized phase means the optimized phase derived in step S460.

In step S480, the LC-SLM may compute a reduced phase when the crosstalk phenomenon is applied to the remedy phase.

In step S490, the LC-SLM may perform phase correction. The LC-SLM may correct the phase based on the difference between the reduced phase derived in step S480 and the optimized phase used in step S470. For example, the corrected phase may be derived by adding the difference value between the reduced phase and the optimized phase to the remedy phase value derived in step S470. The corrected phase value in the LC-SLM may be maximum $3\pi$, and a value greater than about $3\pi$ may be fixed to about $3\pi$.

In step 500, the LC-SLM may determine whether the corrected phase value is a stabilized phase value. When the corrected phase is determined to be the stabilized phase, the procedure may end. When the derived phase is not determined to be the stabilized phase, the procedure may return to step S470 and repeat the above-described steps.

The digital hologram implementation device 100 based on the third algorithm may address the brightness issue around the viewing angle of the hologram image. However, an issue that the brightness uniformity of a plurality of points becomes defected due to the crosstalk phenomenon may occur. A simulation result of the hologram-implemented image based on the third algorithm will be disclosed in FIG. 9 to be described later.

Figure 8:
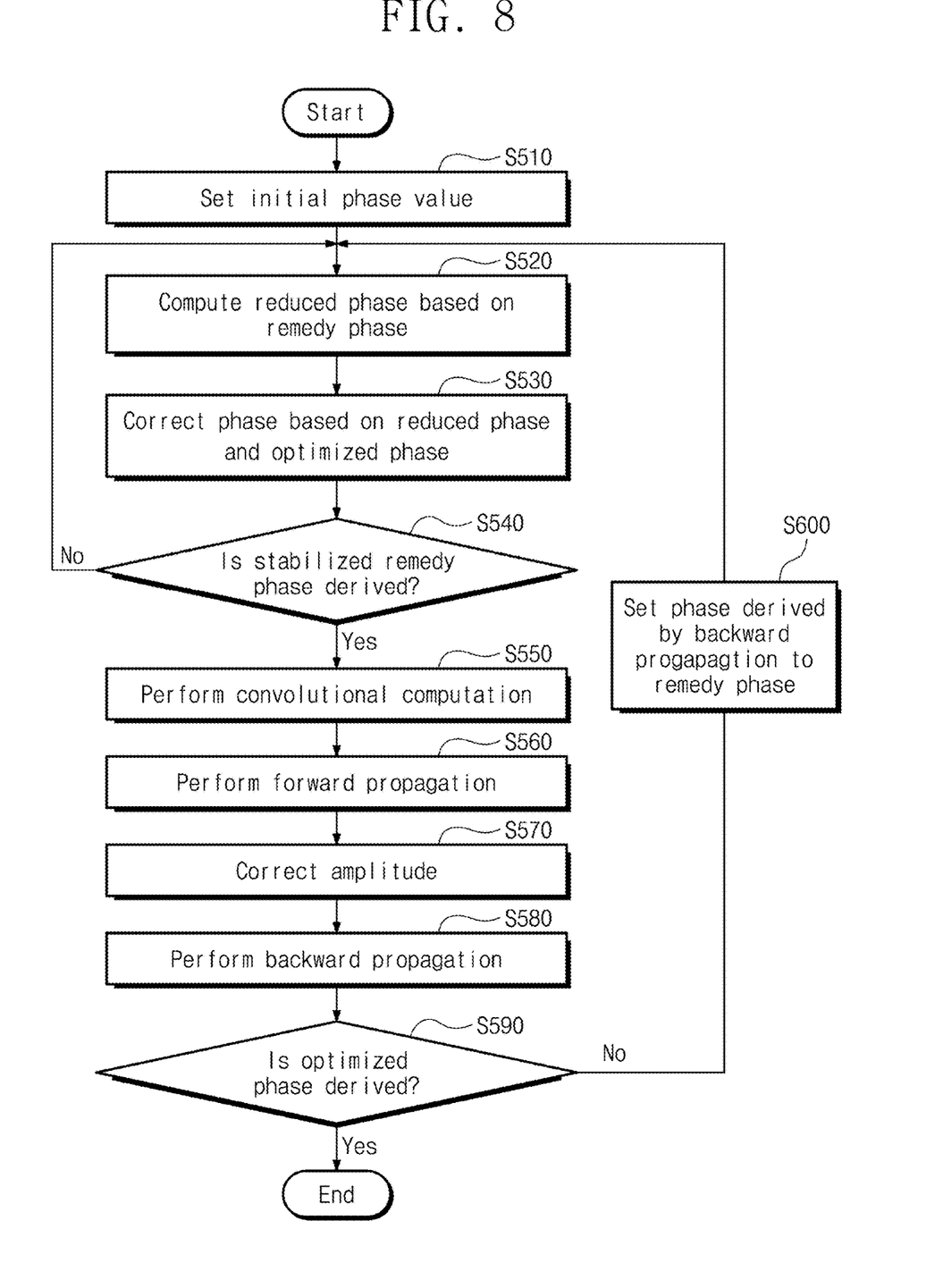
FIG. 8 is a flowchart showing a computation method for implementing a hologram image based on a fourth algorithm including the second algorithm into the first algorithm.

FIG. 8 is a flowchart showing a computation method for implementing a hologram image based on a fourth algorithm including the second algorithm into the first algorithm.

In step S510, the LC-SLM may set an initial phase value of an optical signal to a remedy phase value. The initial phase value may be a phase value of the optical signal itself input to the LC-SLM, or a phase value acquired from executing the preceding algorithm.

In step 520, the LC-SLM may calculate a reduced phase when the crosstalk phenomenon is applied to the remedy phase.

In step S530, the LC-SLM may perform phase correction. The LC-SLM may correct the phase based on the difference between the reduced phase derived in step S520 and a preset optimized phase. For example, the corrected phase may be derived by adding the difference value between the reduced phase and the preset optimized phase to the remedy phase value. For example, the preset optimized phase may be a phase set by a user or derived through executing the preceding algorithm. The corrected phase value in the LC-SLM may be maximum $3\pi$, and a value greater than about $3\pi$ may be fixed to about $3\pi$.

In step 540, the LC-SLM may determine whether the corrected phase value is a stabilized phase value. When the corrected phase is determined to be the stabilized phase, the procedure may proceed to step S550. When the corrected phase is not determined to be the stabilized phase, the procedure may return to step S520 and repeat the above-described steps. Steps S520 to S540 may be repeated K times until the derived phase is determined to be stabilized phase, and K may be determined within the range of 1 to 100.

In step S550, the LC-SLM may perform a convolutional computation on the stabilized phase derived in step S540. The convolutional computation may be based on a convolutional kernel value input to the LC-SLM.

In step S560, the LC-SLM may perform forward propagation on the phase value on which the convolutional computation is performed and an input amplitude value. The amplitude value may be input to the LC-SLM after the convolutional computation for the stabilized phase value. The forward propagation may use various hologram computation schemes. For example, the forward propagation may use a Fourier, Fresnel, angular spectrum, or Rayleigh-Sommerfeld computation. The stabilized phase and amplitude values may be modified into values in the frequency domain by the forward propagation.

In step S570, the LC-SLM may correct the amplitude value in the frequency domain, which is acquired through the forward propagation. More specifically, the LC-SLM may reduce a computation window with respect to the acquired amplitude value in the frequency domain. In addition, the amplitude value may be amended by weighting an input desired amplitude value. More specifically, the LC-SLM may reduce the computation window with respect to the acquired amplitude value in the frequency domain. The amplitude value may be amended by weighting the desired amplitude value based on the amplitude value of the reduced computation window in the frequency domain. The desired amplitude value means a desired amplitude for the hologram image desired to implement by means of the digital hologram implementation. The desired amplitude value may reflect a positive or negative gain to be weighted.

In step S580, the LC-SLM may perform backward propagation on the stabilized phase value and the amended amplitude value. The backward propagation may use various hologram computation schemes. For example, the backward propagation may use a Fourier, Fresnel, angular spectrum, or Rayleigh-Sommerfeld computation. The stabilized phase value and the amended amplitude value may be modified into time-domain values due to the backward propagation.

In step S590, the LC-SLM may determine whether the phase derived by the backward propagation is optimized. When the derived phase is determined to be the optimized phase, the digital hologram implementation device 100 implements a hologram image based on the optimized phase, and the procedure ends. When the derived phase is not determined to be the optimized phase, the procedure may proceed to step S600.

In step S600, the phase derived by the backward propagation may be set to a new remedy phase value. When the new remedy phase value is set, the procedure may return to step S520 and repeat the above-described steps. Steps S520 to S590 may be repeated M times until the derived phase is determined to be optimized, and M may be determined within the range of 1 to 100.

The digital hologram implementation device 100 based on the fourth algorithm may improve the brightness issue around the viewing angle of the hologram image. In addition, the issue that the brightness uniformity of the plurality of points becomes defective due to the crosstalk phenomenon, which is not be addressed by the third algorithm, may be addressed. A simulation result of the hologram-implemented image based on the fourth algorithm will be disclosed in FIG. 9 to be described later.

Figure 9:
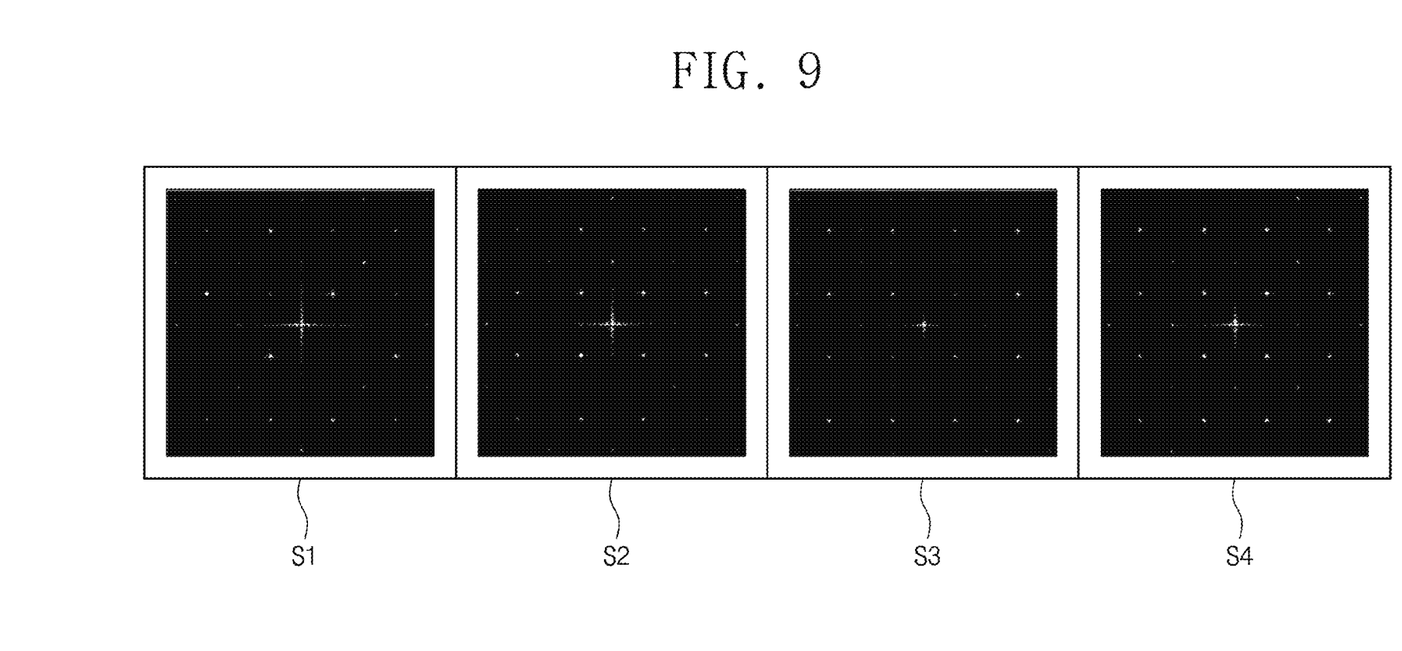
FIG. 9 shows simulation results of hologram images implemented by applying the Gerchberg-Saxton algorithm, the first algorithm, the third algorithm, and the fourth algorithm.

FIG. 9 shows simulation results of hologram images S1, S2, S3, and S4 implemented by applying the Gerchberg-Saxton algorithm, the first algorithm, the third algorithm, and the fourth algorithm. When the hologram image S1 to which the Gerchberg-Saxton algorithm is applied is compared with the hologram image S2 to which the first algorithm is applied, it may be understood that the brightness uniformity of the hologram image S1 to which the first algorithm is applied is improved. However, it may also be understood that the brightness reduction issue around the viewing angle is not addressed.

When the hologram image S2 to which the first algorithm is applied is compared with the hologram image S3 to which the third algorithm is applied, it may be understood that the brightness around the viewing angle of the hologram image S3 to which the third algorithm is applied is improved. However, it also may be understood that the defective brightness uniformity issue is not addressed.

When the hologram image S3 to which the third algorithm is applied is compared with the hologram image S4 to which the fourth algorithm is applied, it may be understood that brightness reduction issue around the viewing angle as well as the brightness uniformity defects of the plurality of points in the hologram image S4 to which the third algorithm is applied are improved.

According to the operation method for a digital hologram implementation device, hologram reproduction characteristics may be prevented from being defective due to a crosstalk phenomenon.

According to the operation method for a digital hologram implementation device, both the brightness uniformity and the viewing angle of a hologram image may be enhanced.

The above-described is detailed embodiments for practicing the present inventive concept. The present disclosure includes not only the above-described embodiments but also simply changed or easily modified embodiments. In addition, the present inventive concept also include techniques easily modified and practiced using the embodiments of the present disclosure. Therefore, the scope of the present disclosure is not limited to the described embodiments but is defined by the claims and their equivalents.

What is claimed is:

1. An operation method for a digital hologram implementation device comprising a backlight and a spatial light modulator, the operation method comprising:
   receiving, from the backlight, an optical signal having an initial phase and an initial amplitude that are values in a time domain;
   setting the initial phase of an optical signal to a first phase;
   computing a second phase based on the first phase, the second phase representing a phase obtained by applying a value corresponding to a crosstalk phenomenon to the first phase;
   correcting the first phase by adding a difference between the second phase and a preset optimized phase to the first phase;
   determining whether the corrected first phase is a stabilized phase;
   performing forward propagation on the optical signal having the stabilized phase and the initial amplitude, so that the stabilized phase and the initial amplitude are converted into values in a frequency domain;
   correcting the amplitude of the optical signal that is in the frequency domain;
   performing backward propagation on the optical signal having the corrected amplitude and the phase that are in the frequency domain to convert the corrected amplitude and the phase in the frequency domain into values in the time domain; and
   determining whether the phase derived by the backward propagation is the optimized phase,
   wherein the operation method is performed by the spatial light modulator.

2. The operation method according to claim 1, wherein the spatial light modulator is a liquid crystal-spatial light modulator.

3. The operation method according to claim 1, wherein the spatial light modulator comprises a two-dimensional pixel array structure comprising a plurality of pixels configured to reproduce a digital hologram.

4. The operation method according to claim 1, wherein the forward propagation and the backward propagation are implemented using at least one of Fourier, Fresnel, Angular Spectrum, or Rayleigh-Sommerfeld computation schemes.

5. The operation method according to claim 1, wherein, when the corrected first phase is greater than about $3\pi$, the corrected first phase is fixed to about $3\pi$.

6. The operation method according to claim 1, wherein, when the corrected first phase is not determined as the stabilized phase, the operation method further comprises repeating sequentially: the computing of the second phase based on the first phase; the correcting of the first phase based on the difference between the second phase and the preset optimized phase; and the determining of whether the corrected first phase is the stabilized phase.

7. The operation method according to claim 6, wherein the repeating sequentially is executed a number of times corresponding to a natural number of ranging from 1 to 100.

8. The operation method according to claim 1, further comprising:
   implementing a hologram image based on the optimized phase, when the phase derived by the backward propagation is determined to be the optimized phase.

9. The operation method according to claim 1, wherein, when the phase derived by the backward propagation is not determined to be the optimized phase, the operation method further comprises repeating sequentially: the computing of the second phase based on the first phase; the correcting of the first phase based on the difference between the second phase and the preset optimized phase; the determining of whether the corrected first phase is the stabilized phase; the performing of the forward propagation on the optical signal; the correcting of the amplitude of the optical signal; the performing of the backward propagation on the optical signal; and the determining of whether the phase derived by the backward propagation is the optimized phase.

10. The operation method according to claim 9, wherein the repeating sequentially is executed a number of times corresponding to a natural number ranging from 1 to 100.

11. The operation method according to claim 9, further comprising:
    setting a value of the phase derived by the backward propagation to a new value of the first phase, when the phase derived by the backward propagation is not determined to be the optimized phase.

12. The operation method according to claim 1, further comprising, before performing the forward propagation on the optical signal:
    performing a convolutional computation on the corrected first phase when the corrected first phase is determined as the stabilized phase,
    wherein performing the forward propagation on the optical signal comprises performing the forward propagation on the optical signal having the stabilized phase on which the convolutional computation is performed and the initial amplitude, so that the stabilized phase on which the convolutional computation is performed and the initial amplitude are converted into values in the frequency domain.

* * * * *